(12) United States Patent
Audigie et al.

(10) Patent No.: US 8,783,197 B2
(45) Date of Patent: Jul. 22, 2014

(54) SINGLE SEEDER WITH A FOLDABLE CHASSIS AND AT LEAST ONE DISTRIBUTION HEAD ARRANGED AT THE REAR OF THE SEEDER

(75) Inventors: Jean-Charles Audigie, Bouxwiller (FR); Stephane Renault, Allenwiller (FR); Martin Kauff, Wolschheim (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 13/882,335

(22) PCT Filed: Nov. 2, 2011

(86) PCT No.: PCT/FR2011/052556
§ 371 (c)(1),
(2), (4) Date: Apr. 29, 2013

(87) PCT Pub. No.: WO2012/059686
PCT Pub. Date: May 10, 2012

(65) Prior Publication Data
US 2013/0213284 A1    Aug. 22, 2013

(30) Foreign Application Priority Data
Nov. 4, 2010 (FR) ...................................... 10 59088

(51) Int. Cl.
*A01C 7/08* (2006.01)

(52) U.S. Cl.
USPC ............................ 111/174; 111/175; 111/193

(58) Field of Classification Search
USPC ......... 111/52–66, 134–137, 69–71, 170, 174, 111/175, 190–195
See application file for complete search history.

(56) References Cited

FOREIGN PATENT DOCUMENTS

| DE | 198 33 691 | 2/2000 |
|---|---|---|
| EP | 0 873 675 | 10/1998 |

OTHER PUBLICATIONS

International Search Report Issued Feb. 29, 2012 in PCT/FR11/52556 Filed Nov. 2, 2011.

*Primary Examiner* — Christopher J Novosad
(74) *Attorney, Agent, or Firm* — Oblon, Spivak, McClelland, Maier & Neustadt, L.L.P.

(57) ABSTRACT

A single seeder with a foldable chassis composed of a central section arranged transversely with respect to the direction of work and of two lateral sections articulated on the central section, seeder elements being distributed in a regular manner on the chassis, the seeder including burying coulters for the distribution of product extending at the front of a respective seeder element, a distribution head and pipes connected on the distribution head and ending at the burying coulters. The distribution head is arranged at the rear of the seeder, behind the seeder elements, taking into account the direction of advance.

10 Claims, 5 Drawing Sheets

Figure 1:
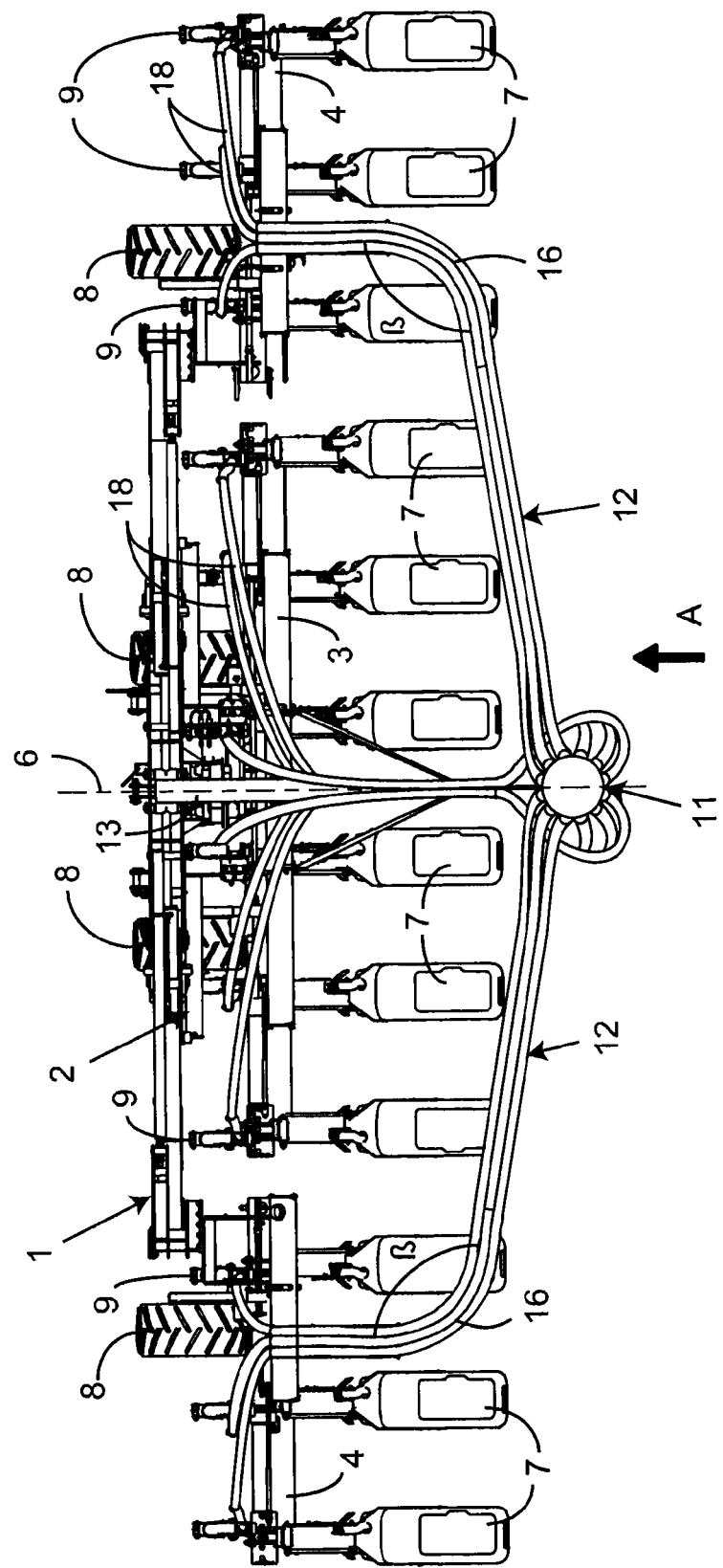

SINGLE SEEDER WITH A FOLDABLE CHASSIS AND AT LEAST ONE DISTRIBUTION HEAD ARRANGED AT THE REAR OF THE SEEDER

The present invention relates to the general technical field of agricultural machinery. The invention concerns a single seeder with a foldable chassis composed of a central section arranged transversely with respect to the direction of work, and of two lateral sections articulated on the central section, seeder elements being distributed in a regular manner on the chassis, the seeder including burying coulters for the distribution of product extending substantially at the front of a respective seeder element, at least one distribution head and pipes connected on the at least one distribution head and ending at the burying coulters.

Such foldable seeders with a distribution of fertilizer are known. With a foldable chassis, the distribution of fertilizer is carried out pneumatically using a distribution head. The chassis supports seeder elements and burying coulters situated at the front of the seeder elements. The lateral sections can be folded upward so as to comply with the transportation gauge for travelling on the roads. The distribution head is generally positioned on the central section in the vicinity of the median vertical plane of the chassis. The pipes connecting the distribution head with the burying coulters also extend in this central zone. The turbine allowing the distribution of the seeds which is driven by the power take-off of the tractor is also situated in this zone. This central position of the distribution head is given in particular by the lateral sections which fold during transport. Such a foldable chassis is applied to working widths of up to 6 meters. In this zone with a high concentration of components, access to the distribution head and to the pipes is not easy. In fact, it is usual to have to release or reconnect one of the pipes which has not followed the opening movement of the chassis when passing from the folded position to the work position.

Other foldable single seeders with a working width greater than 6 meters are also known. Such a seeder ED 602-K is presented in the brochure AMAZONE ED 02 reference MI 349/D 690 (F) 02.05. The chassis of this seeder carries twelve seeder elements which are distributed in a regular manner over the entire working width. The seeder also carries out the distribution of fertilizer via burying coulters which are supplied by pipes connected on a distribution head which is supplied with fertilizer by the front hopper. To make access to the distribution head easier, it is situated at the front of the chassis, directly behind the tractor. This zone was created for the setting-up of the distribution head by moving back the chassis and the seeder elements with respect to the tractor. With this seeder being carried by the three-point hitch of the tractor, the offsetting of the seeder elements towards the rear increases the overhang. To carry and move this seeder in total safety, a higher power tractor would therefore have to be used.

The present invention has the aim of overcoming the above-mentioned drawbacks. In particular, it must propose a seeder having a great working width with distribution of products such as fertilizer, for which the centre of gravity is close to the tractor, and for which access to the pipes is made easier.

To this end, an important feature of the invention consists in that the at least one distribution head extends at the rear of the seeder, behind the seeder elements, taking into account the direction of advance. Owing to this position of the distribution head, the chassis and the seeder elements are kept close to the three-point hitch of the tractor. The overhang of the seeder is reduced. By extending at the rear, the distribution head is also more easily accessible.

Figure 2:
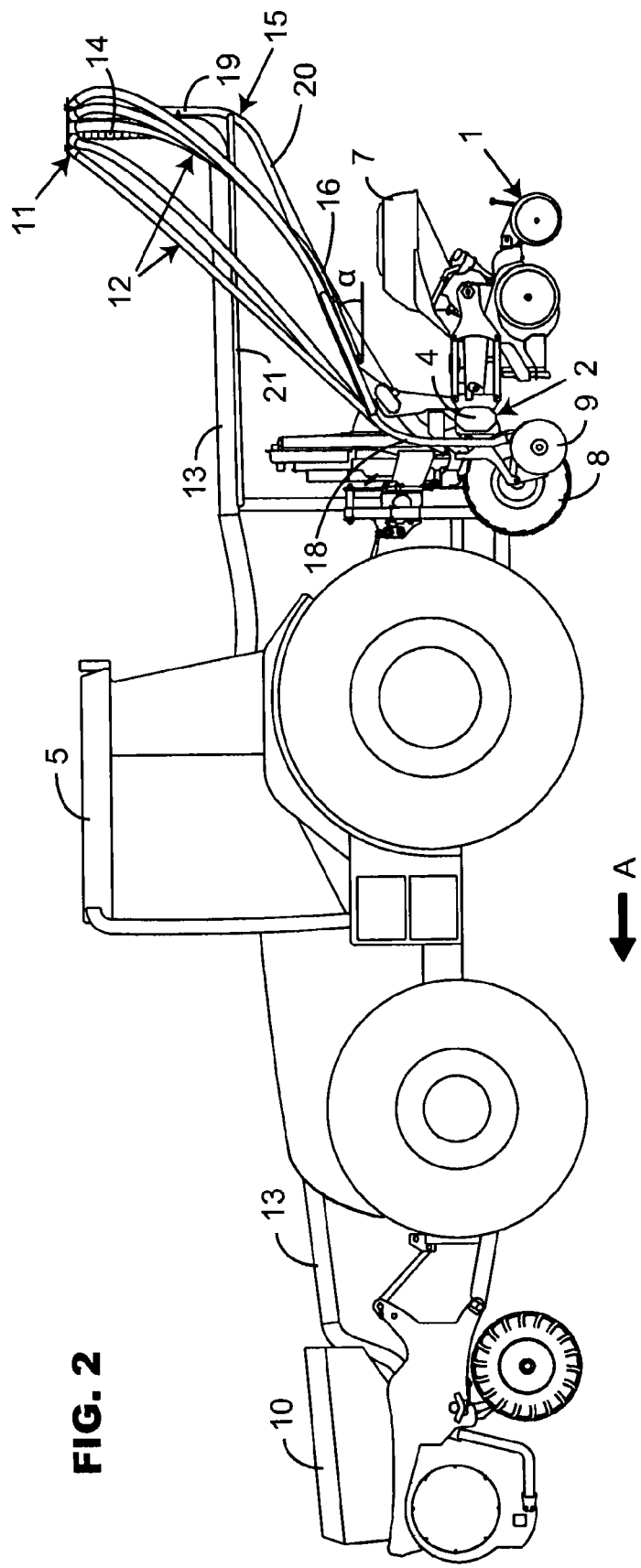
Figure 3:
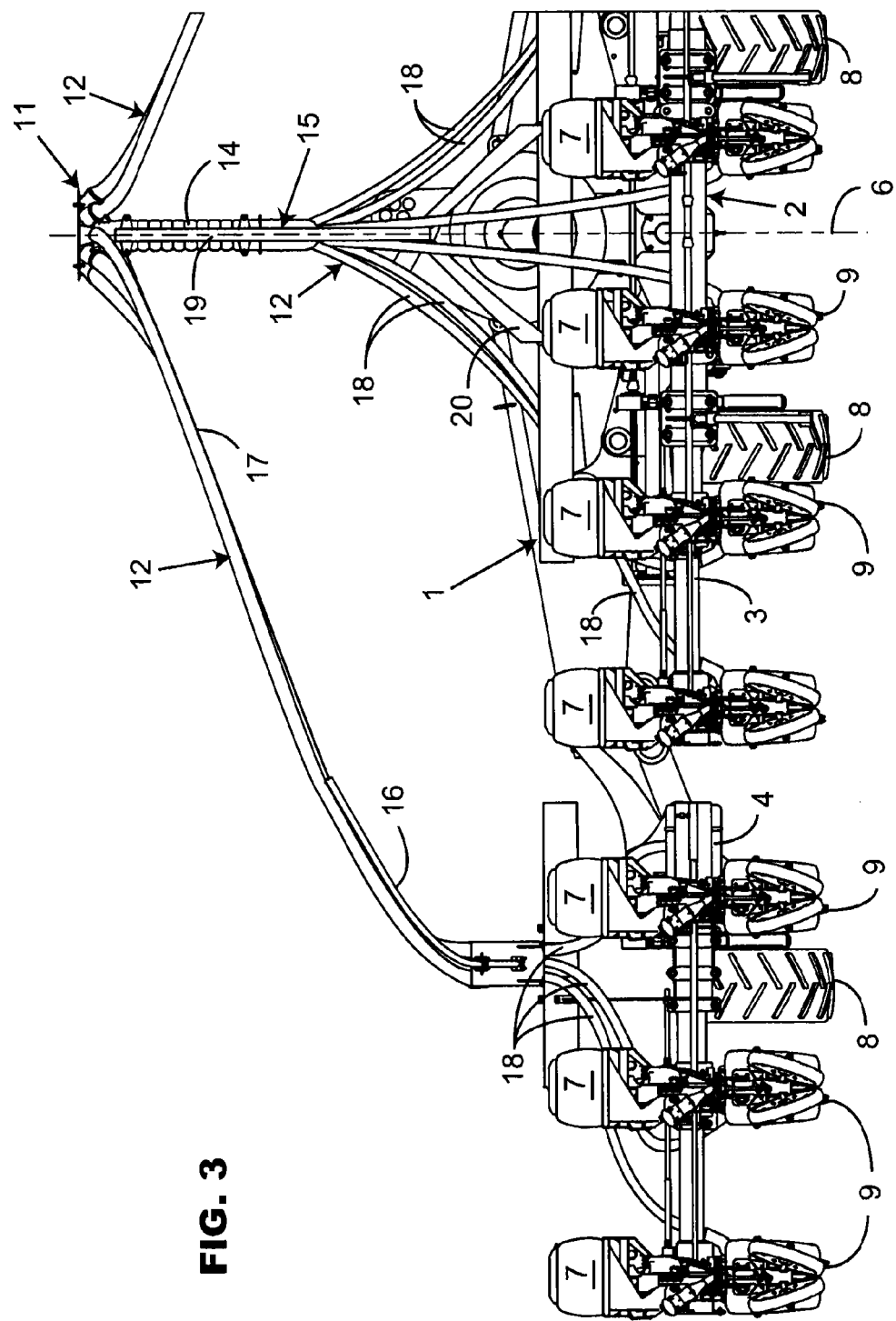
Figure 4:
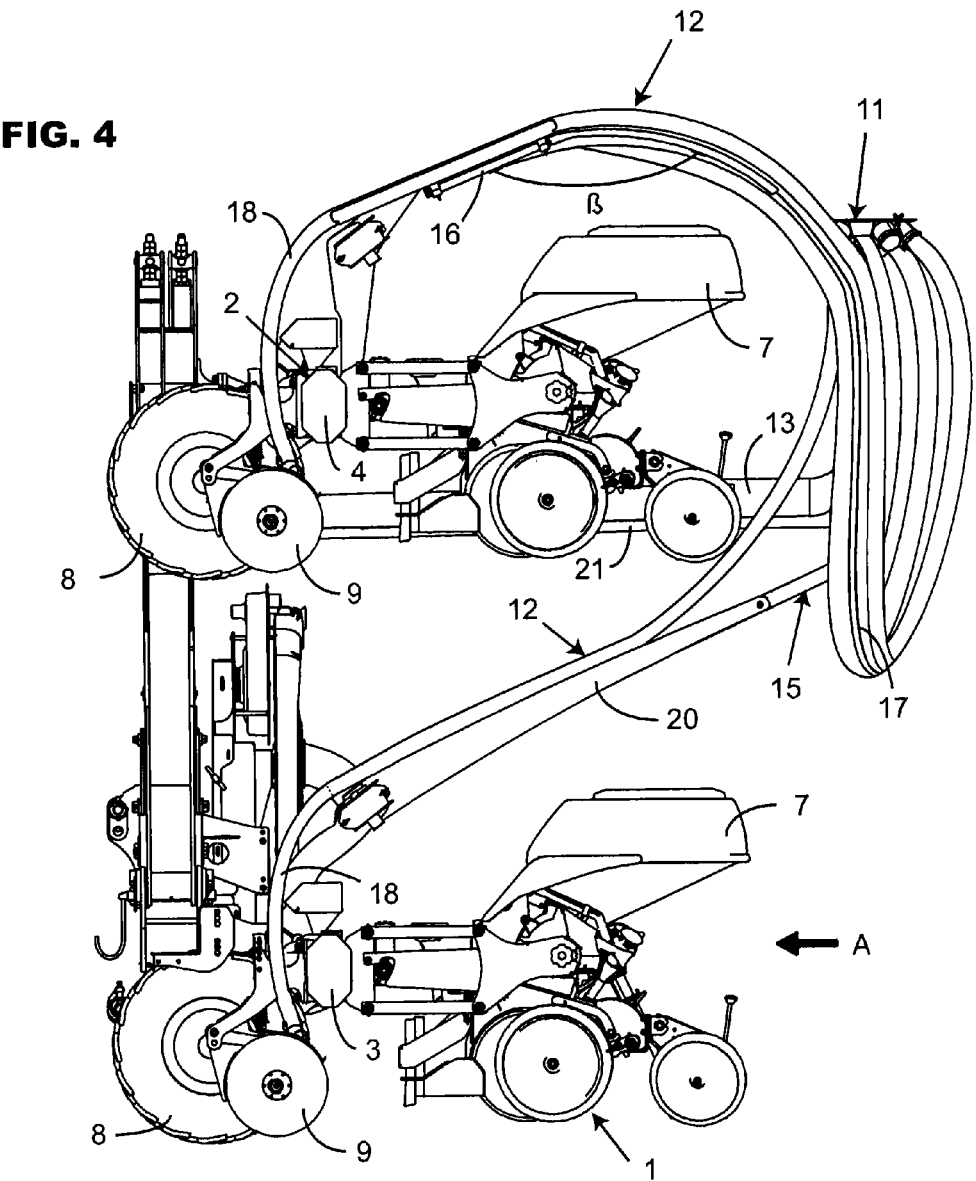
Figure 5:
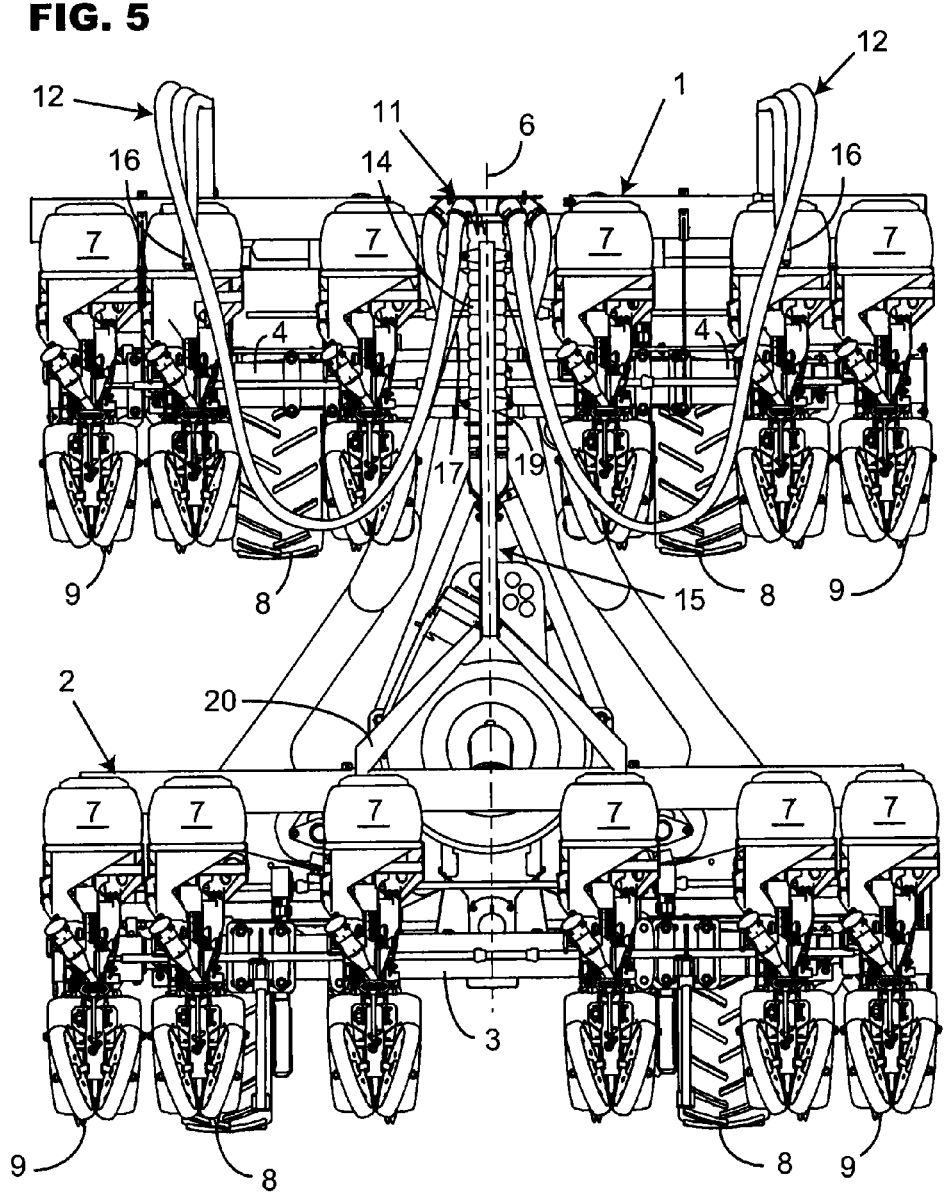

Other features and advantages of the invention will emerge from the following description with regard to the attached drawings which are given only by way of non-restrictive examples of the invention. In these drawings:

FIG. 1 represents a top view of a seeder according to the present invention in a work configuration, FIG. 2 is a side view of the seeder of FIG. 1 hitched to a tractor, FIG. 3 represents a rear view of a part of the seeder of FIG. 1, FIG. 4 represents the seeder according to the present invention during transport according to a side view, FIG. 5 is a rear view of the seeder of FIG. 4.

The agricultural machine according to the invention is a seeder (1), called single seeder or planter. It works on several rows and distributes the seeds one by one on the seed line with constant spacings. FIG. 1 shows the seeder (1) in top view in its work position. The seeder (1) has a foldable chassis (2) composed of a central section (3) and of two lateral sections (4). The central section (3) is arranged horizontally and transversely with respect to the work direction of the seeder (1). The lateral sections (4) are articulated on the central section (3) so as to be displaceable transversely and vertically with respect to the central section (3). During work, the lateral sections (4) extend on either side of the central section (3), whereas during transport, the lateral sections (4) extend substantially above the central section (3). This seeder (1) therefore has a large working width, whilst complying with the transport gauge. Each lateral section (4) is connected to the central section (3) by means of a deformable mechanism, allowing it to pass from an unfolded work position to a folded transport position. A tractor (5) is brought to move this seeder (1) along a direction of advance indicated by the arrow (A). In the rest of the description, the terms "front", "rear" and "in front", "behind" are defined with respect to the direction of advance (A).

Seeder elements (7) are distributed on the chassis (2) in a regular and symmetrical manner with respect to the median vertical plane (6) of the chassis. The spacing between the seeder elements (7) is adjustable. Each seeder element (7) has a hopper, a metering device and a planting device. The assembly of the seeder element (7) on the chassis (2) is carried out by means of a deformable parallelogram which allows it to move parallel to the ground. In order to ensure a homogeneous metering of the seeds, the speed of rotation of the metering device is advantageously proportional to the advance speed of the seeder (1). To this end, the chassis (2) rests on the ground by means of wheels (8).

The seeder (1) of the invention also allows the distribution of product, for example the starter fertilizer to promote the germination and the development of the young plant. This seeder (1) therefore carries out the seeding and the supply of fertilizer simultaneously in a single pass. FIG. 2 is a side view of such a seeder. To this end, it comprises burying coulters (9) which deposit the fertilizer in the earth. They are placed at the front of a respective seeder element (7). The distribution of fertilizer is carried out pneumatically from a storage hopper (10) via a metering element, a distribution head (11) and pipes (12). The pipes (12) are connected on the distribution head (11) and each supply a burying coulter (9).

According to an important feature of the invention, the at least one distribution head (11) is arranged at the rear of the seeder (1), behind the seeder elements (7) taking into account the direction of advance (A). With such an arrangement, the overhang of the seeder is reduced, since the chassis and the seeder elements are kept close to the three-point hitch of the tractor. With the rear arrangement of the distribution head (11), the latter is accessible both during work and during transport of the seeder (1). The access to the pipes (12) is also improved. In this rear position, substantially above the seeder elements (7), the distribution head (11) is visible to the user from the cab of the tractor (5) during work. The rear position of the distribution head (11) is visible in FIG. 1, which is a top view, or in FIG. 2 representing a side view. The space in length taken by the seeder (1), taking into account the direction of advance (A), corresponds to the length of the chassis (2) with the seeder elements (7). The distribution head (11) extends beyond the seeder elements (7).

This rear arrangement of the distribution head (11) has practically no influence on the position of the centre of gravity of the seeder (1). The distribution head (11) and the pipes (12) are hollow parts with a weight which is rather negligible with respect to the weight of a seeder element (7) which can reach 200 kg when its hopper is filled with maize seeds. By arranging the chassis (2) and the seeder elements (7) close to the three-point hitch of the tractor (5), the overhang is reduced. With the parts considered as "heavy" arranged closer to the tractor (5), the centre of gravity of the seeder (1) remains close to the tractor (5).

The seeder (1) represented in FIG. 1 comprises twelve seeder elements (7) which are distributed on the chassis (2). The central section (3) is provided with hitching elements making it possible to hitch the foldable chassis (2) on the three-point hitch of the agricultural tractor (5). This hitching makes it possible to transfer the weight and the stress of the seeder (1) on the rear wheels of the tractor (5). This is therefore a seeder of the mounted type. The central section (3), which is fixed, carries six seeder elements (7), and each of the lateral sections (4) carries three seeder elements (7). A burying coulter (9) is arranged in front of each seeder element (7). The burying coulter (9) can be a share, a tine or a double disc which deposits the fertilizer under the seeding line and beside the line. In accordance with FIG. 2, the tractor carries the seeder (1) at the rear and the storage hopper (10) at the front. With this hopper in the front position, the distribution of the load on the tractor (5) is ideal. The handling of the tractor (5) at the field end and on hills is improved. The front position of the fertilizer and the lightening of the weight of the seeder balance the tractor (5). The compaction of the soils is also reduced, because the load on the rear axle of the tractor (5) has decreased. Owing to the use of a front hopper for the storage of fertilizer, the autonomy of the seeder (1) is greater and the work output is greater. The filling of the hopper is easy since the accessibility to the hopper in the front position is easier.

It is therefore noted that the storage hopper (10) extends at the front of the distribution head (11). The conveying of the fertilizer towards the rear is carried out by means of a conveying duct (13) connecting the storage hopper (10) to the distribution head (11). Thus, the fertilizer contained in the storage hopper (10) is calibrated by the metering element then mixed with air produced by a blower to be sent towards the distribution head (11). The distribution head (11) extends to the vertical of a ringed column (14) which directs the air/fertilizer mixture to the distribution head (11). Then the fertilizer, distributed in a homogeneous manner, is conveyed towards each burying coulter (9) via the respective pipe (12). The number of pipes (12) therefore corresponds to the number of outlets of the distribution head (11), which corresponds to the number of burying coulters (9).

In this example embodiment, the distribution of the fertilizer is carried out in a centralized manner with a single metering element and a distribution head (11) with twelve outlets.

The distribution head (11) supplies both the burying coulters (9) of the central section (3) and also those of the lateral sections (4). When the seeder has a greater number of burying coulters than the number of outlets of the distribution head, two or even more distribution heads (11) will be used. FIG. 3 represents the seeder (1) in a work position with a part of the pipes (12) connecting the distribution head (11) to the burying coulters (9). To ensure a sufficient height of fall and to ensure a uniform distribution of the seeds, the distribution head (11) must extend at a certain height. The distribution head (11) thus extends above the seeder elements (7). The pipes (12) have a downward trajectory (FIG. 2), taking into account the direction of advance (A). For an optimum conveying of the fertilizer towards the burying coulters (9), the trajectory of the pipes (12) is, as can be seen in FIG. 3, more or less direct and oriented downward from the distribution head (11) to the burying coulters (9). The pipes (12) extend overall above the seeder elements (7).

FIGS. 4 and 5 represent the seeder according to the invention in its transport position respectively according to a side view and a rear view. Owing to the foldable chassis (2), the large-width seeder (1) complies with the maximum transport gauge allowed for travel on the roads. For France, this transport gauge is 3 meters in width and 4 meters in height. The central section (3) and the lateral sections (4) are each formed by a telescopic transverse beam making it possible to reduce the space occupied in width. In these figures, it can be seen that the distribution head (11) extends beyond the displacement zone of the lateral sections (4). The distribution head (11) and the pipes (12) therefore extend in a zone without interference with the seeder elements (7), whether during work or during transport.

In the example represented in FIGS. 1, 2 and 4, the distribution head (11) is connected to the chassis (2) by means of a support (15). This support (15) is preferably mounted on the central section (3) which is fixed. The support (15) extends substantially in the median vertical plane (6) of the seeder (1) or of the chassis (2). Its function is to keep the distribution head (11) at a certain height so that the drop of the fertilizer is sufficient to ensure a uniform distribution. The support (15) extends overall in the direction of advance (A), it has a vertical part (19) which is intended to support the ringed column (14) and a part (20) inclined towards the central section (3). The support (15) also has a substantially horizontal part (21) making it possible to support a part of the conveying duct (13) as well as the bend beneath the ringed column (14). The distribution head (11) extends, advantageously, in the vertical space occupied by the seeder (1) during transport. The seeder represented in FIG. 1 is a seeder with an even number of rows, which allows the distribution head (11) to be placed in a central position of the chassis (2). The arrangement and the length of the different pipes (12) supplying the burying coulters (9) can be symmetrical with respect to the median vertical plane (6). The support (15) of the distribution head (11) therefore also extends in the median vertical plane (6).

In order to allow an opening in the work position or respectively a folding for transport without interference with the parts on movement, the pipes (12) are guided over a portion of their length. This guidance allows to prevent jamming with the seeder elements (7) during the movement of the lateral sections (4). The guidance length is therefore substantially equal to the space in length occupied by the seeder elements (7). The trajectory of the pipes (12) is advantageously given by a movable guide (16) of curved shape. The base of the movable guide (16) is connected to the beam of the lateral section (4). It extends substantially perpendicularly to the beam in top view being inclined by an acute angle (α) with respect to the horizontal in side view. In light of FIG. 1, it can be noted that a movable guide (16) allows the guidance of the trajectory of the three pipes (12) of each lateral section (4). The curved shape of the movable guide (16) is advantageously oriented towards the distribution head (11) in the work position of the seeder (1). The opening angle (β) of the movable guide (16) between its base and its curved part is, preferably, a large angle greater than or equal to 90°, preferably of 120°. By being thus designed and oriented, the movable guide (16) gives a more or less direct trajectory of the pipes (12), which promotes the flow of the fertilizer towards the burying coulters (9). According to FIG. 3, the pipes (12) have a length such that each pipe (12) is more or less taut. The tubes (12) extend substantially above the seeder elements (7).

According to the figures, at least one movable guide (16) allows the guidance of the pipes (12) supplying the burying coulters (9) mounted on the lateral sections (4). Each movable guide (16) pivots freely about its axis, which is directed substantially according to the acute angle (α) with respect to the horizontal. Advantageously, the movable guide (16) is achieved by a curved tube of round cross-section. It can therefore pivot on itself such that the pipes (12) pass behind the seeder elements (7) during folding, taking into account the direction of advance (A). The pivoting of the movable guide (16) takes place with respect to the axis of its base, which is oriented with respect to the beam of the lateral section (4). During folding, each lateral section (4) moves closer to the distribution head (11) and consequently the pipes (12) slacken and fold, forming a loop. When the tension of the pipes (12) decreases, the movable guide (16) pivots under the effect of gravity until it extends in a vertical plane during transport. Owing to the pivoting of the movable guide (16), the pipes (12) extend beyond the displacement zone of the seeder elements (7) on the opening or respectively the folding of the chassis (2). It can be seen in FIG. 4 that owing to the opening angle (β) of the curved shape of the movable guide (16), the pipes (12) extend behind the seeder elements (7), without the risk of interference with equipments mounted on the seeder elements (7). The movable guide (16) therefore imposes the orientation of the pipes (12) during work, during transport and during the folding or opening, so as to prevent jamming and/or interference during movement of the lateral sections (4).

According to an alternative, the movable guide (16) is connected to the beam of the lateral section (4) by means of an intermediate support.

To ensure a minimum tension on the pipes (12) in the zone between the distribution head (11) and the movable guide (16), they are guided and tensioned owing to a flexible guide (17). This flexible guide (17) brings a flexibility enabling the pipes (12) to pass from a work position to a transport position and vice versa. It is advantageously composed of a chain associated with a spring (not shown). The latter is connected to the ringed column (14). This is a draw-spring. The chain is connected to the movable guide (16). Owing to the chain associated with the spring, a tension is exerted on the pipes (12). Too great a length would bring about a deflection of the pipe (12). This deflection causes an accumulation of fertilizer in the pipe (12) and consequently a poor flow of the fertilizer towards the burying coulter (9). The tension exerted on the pipes (12) is advantageously adjustable owing to the chain. The pipes (12) are generally flexible ringed tubes and the chain makes it possible to support these flexible pipes (12). It also makes it possible to compensate the increase in length which the pipes (12) can acquire over time. The flexible guide (17) allows the formation of the loop during folding. During opening of the chassis (2), the pivoting of the movable guide (16) is advantageously given by the pipes (12) and/or by the chain.

So as to adapt to the different spacing adjustments between the seeder elements (7), each pipe (12) also comprises a flexible portion (18) on the side of the corresponding burying coulter (9).

According to an alternative, the seeder (1) of the invention will also be able to be connected behind a trailer which is hitched to the tractor (5). The seeder is then carried by the trailer.

With a seeder having an odd number of rows, one of the seeder elements extends in the median vertical plane (6). The distribution head (11) and the pipes (12) supplying the burying coulters (9) mounted on the central section (3) can be offset with respect to the median vertical plane (6).

It is readily evident that the invention is not limited to the embodiments described above and represented in the attached drawings. Modifications remain possible, in particular with regard to the constitution or the number of the various elements or by substitution of technical equivalents without, however, departing from the scope of protection as defined by the following claims.

The invention claimed is:

1. A single seeder, comprising:
    a foldable chassis including
        a central section arranged transversely with respect to a direction of work, and
        two lateral sections articulated on the central section,
    seeder elements distributed on the foldable chassis,
    burying coulters for the distribution of product extending at a front of a respective seeder element,
    one distribution head, and
    pipes connected on the distribution head and ending at the burying coulters,
    wherein the distribution head is arranged rear of the single seeder, behind the seeder elements, with respect to a direction of advance.

2. The seeder as claimed in claim 1, wherein the distribution head extends beyond a displacement zone of the seeder elements between a work position and a transport position.

3. The seeder as claimed in claim 1, wherein one movable guide allows the guiding of the pipes supplying the burying coulters mounted on the lateral sections.

4. The seeder as claimed in claim 3, wherein each movable guide has a base, the base is connected to a beam of the lateral section and extends perpendicularly to the beam of the lateral section, being inclined by an acute angle with respect to the horizontal.

5. The seeder as claimed in claim 3, wherein each movable guide has a curved shape directed towards the distribution head in a work position and having an opening angle greater than 90°.

6. The seeder as claimed in claim 3, wherein each movable guide pivots freely about an axis of the movable guide, the axis of the movable guide being directed according to an acute angle with respect to the horizontal.

7. The seeder as claimed in claim 3, wherein the pipes extend behind the seeder elements, taking into account a direction of advance during a displacement of the lateral sections towards a transport position.

8. The seeder as claimed in claim 3, wherein a flexible guide supports the pipes between the distribution head and a respective movable guide.

9. The seeder as claimed in claim 1, wherein the distribution head extends in a median vertical plane of the single seeder.

10. The seeder as claimed in claim 1, wherein the distribution head extends in a vertical space occupied by the single seeder during transport.

\* \* \* \* \*